(12) United States Patent
Degner et al.

(10) Patent No.: US 10,892,657 B1
(45) Date of Patent: Jan. 12, 2021

(54) ELECTRIC MACHINE

(71) Applicant: FORD GLOBAL TECHNOLOGIES, LLC, Dearborn, MI (US)

(72) Inventors: Michael W. Degner, Novi, MI (US); Myung Ki Sung, Ypsilanti, MI (US); Prasad Dev Hanumalagutti, Dearborn, MI (US); Edward Chan-Jiun Jih, Troy, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 72 days.

(21) Appl. No.: 16/445,906

(22) Filed: Jun. 19, 2019

(51) Int. Cl.
*H02K 3/24* (2006.01)
*B60K 6/26* (2007.10)
*B60K 1/00* (2006.01)

(52) U.S. Cl.
CPC .............. *H02K 3/24* (2013.01); *B60K 1/00* (2013.01); *B60K 6/26* (2013.01); *B60K 2001/006* (2013.01); *B60Y 2200/91* (2013.01); *B60Y 2200/92* (2013.01); *B60Y 2306/05* (2013.01); *B60Y 2400/60* (2013.01)

(58) Field of Classification Search
CPC ... H02K 3/24; B60K 1/00; B60K 6/26; B60K 2001/006; B60Y 2200/91; B60Y 2200/92; B60Y 2306/05; B60Y 2400/60
See application file for complete search history.

(56) References Cited

U.S. PATENT DOCUMENTS

| 10,086,538 B2 | 10/2018 | Hanumalagutti et al. | |
| 2013/0301328 A1* | 11/2013 | Ito | B60L 3/003 363/141 |
| 2014/0217843 A1* | 8/2014 | Suh | H02K 9/22 310/57 |
| 2016/0355084 A1 | 12/2016 | Uozumi et al. | |
| 2017/0271940 A1* | 9/2017 | Hanumalagutti | B29C 41/40 |

* cited by examiner

*Primary Examiner* — Naishadh N Desai
(74) *Attorney, Agent, or Firm* — David B. Kelley; Brooks Kushman P.C.

(57) ABSTRACT

An electric machine configured to propel a vehicle includes a stator, a rotor, and an end plate. The stator has end windings that protrude axially therefrom. The rotor is disposed within the stator. The end plate is secured to an axial end of the rotor. The end plate defines a primary chamber, a secondary chamber that is radially outward of the primary chamber, and a first outlet channel that is configured to direct fluid onto the end windings. The primary chamber is in fluid communication with a fluid source and the secondary chamber. The secondary chamber is in fluid communication with the outlet channel.

20 Claims, 4 Drawing Sheets

ELECTRIC MACHINE

TECHNICAL FIELD

The present disclosure relates to hybrid/electric vehicles and electric machines that are configured to propel hybrid/electric vehicles.

BACKGROUND

Hybrid/electric vehicles may utilize an electric machine for propulsion in addition to or in lieu of an internal combustion engine.

SUMMARY

An electric machine configured to propel a vehicle includes a stator, a rotor, and an end plate. The stator extends in an axial direction between opposing stator ends. The stator has end windings that protrude from each stator end. The stator defines a central opening. The rotor is disposed within the central opening and extends in the axial direction between opposing rotor ends. The end plate is secured to a first of the rotor ends. The end plate defines a primary chamber, a plurality of secondary chambers that are each radially outward of the primary chamber, and a plurality of outlet channels that are configured to direct fluid onto the end windings. The primary chamber is in fluid communication with a fluid source and each of the plurality of secondary chambers. Each of the plurality of secondary chambers are in fluid communication with at least one of the outlet channels of the plurality of outlet channels.

An electric machine configured to propel a vehicle includes a stator, a rotor, and an end plate. The stator has end windings that protrude axially therefrom. The rotor is disposed within the stator. The end plate is secured to an axial end of the rotor. The end plate defines a primary chamber, a secondary chamber that is radially outward of the primary chamber, and a first outlet channel that is configured to direct fluid onto the end windings. The primary chamber is in fluid communication with a fluid source and the secondary chamber. The secondary chamber is in fluid communication with the outlet channel.

A vehicle includes an electric machine and an end plate. The electric machine is configured to propel the vehicle. The electric machine comprises a stator having end windings and a rotor. The end plate is secured to an end of the rotor. The end plate defines a primary chamber, a secondary chamber that is radially outward of the primary chamber, and an outlet channel that is configured to direct fluid onto the end windings. The primary chamber is in fluid communication with a transmission pump and the secondary chamber. The secondary chamber is in fluid communication with the outlet channel.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
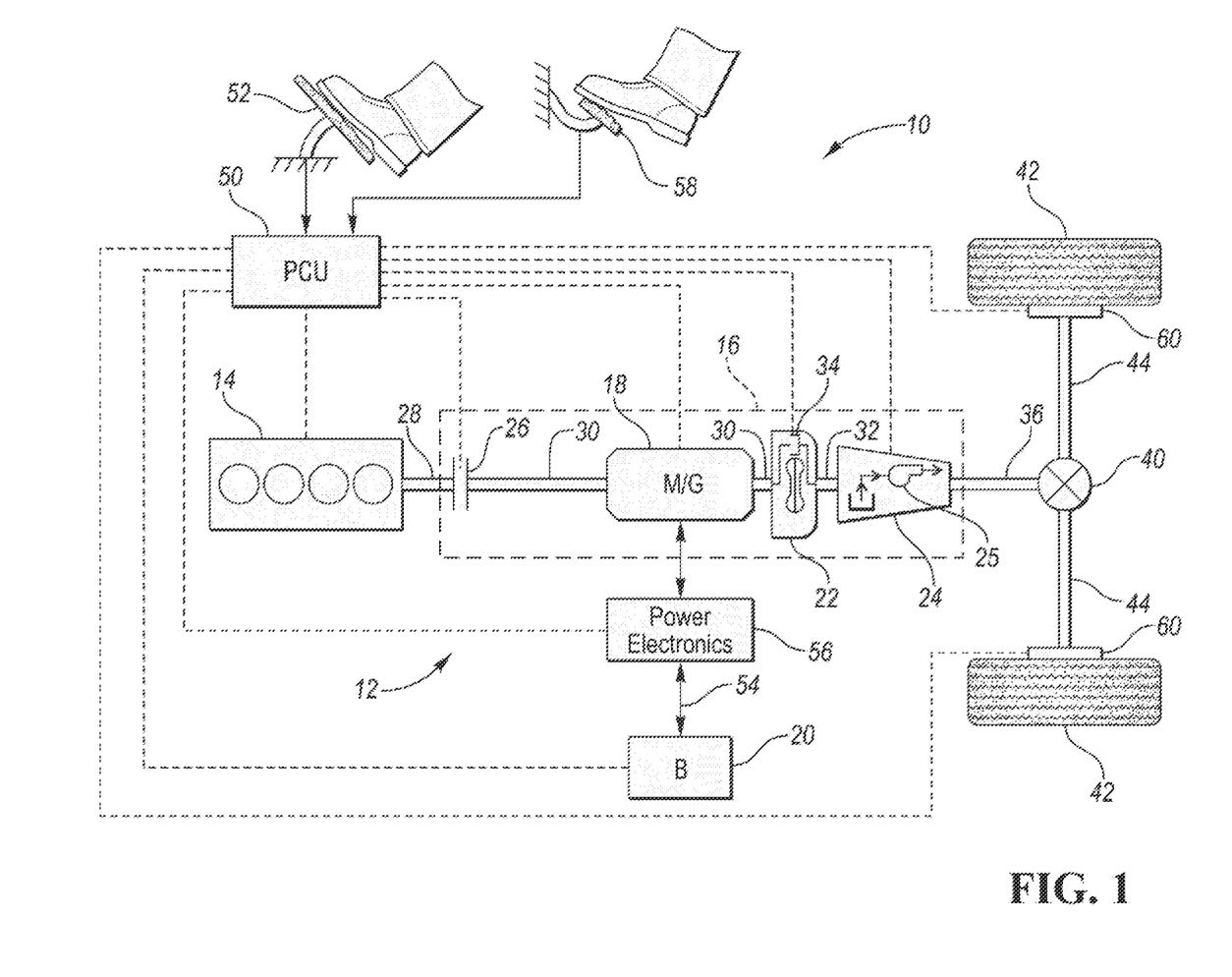
FIG. 1 is a schematic illustration of an exemplary powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (MG) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are hydraulically controlled and selectively placed in different gear ratios by selective engagement of friction elements such as clutches and brakes (not shown) to establish the desired multiple discrete or step drive ratios. A transmission pump 25 may be configured to deliver transmission fluid to the gearbox 24, the disconnect clutch 16, the M/G 18, and the torque converter 22 in order to selectively engage the friction elements within the gearbox 24, to selectively engage the disconnect clutch 26, to provide a fluid coupling within the torque converter 22, and/or to provide lubrication to any of the moving components (e.g., shafts) with the gearbox 24, disconnect clutch 16, M/G 18, and torque converter 22. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (IO) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the IO interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" or "EV" operation mode.

In any mode of operation, the MG 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational (or motive) energy or power from spinning wheels 42 is transferred back through the gearbox 24, torque converter 22, (and/or torque converter bypass clutch 34) and is converted into electrical energy for storage in the battery 20.

It should be understood that the schematic illustrated in FIG. 1 is merely exemplary and is not intended to be limiting. Other configurations are contemplated that utilize selective engagement of both an engine and a motor to transmit through the transmission. For example, the MG 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

It should be understood that the vehicle configuration described herein is merely exemplary and is not intended to be limited. Other electric or hybrid vehicle configurations should be construed as disclosed herein. Other vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other electric or hybrid vehicle configuration known to a person of ordinary skill in the art.

Figure 2:
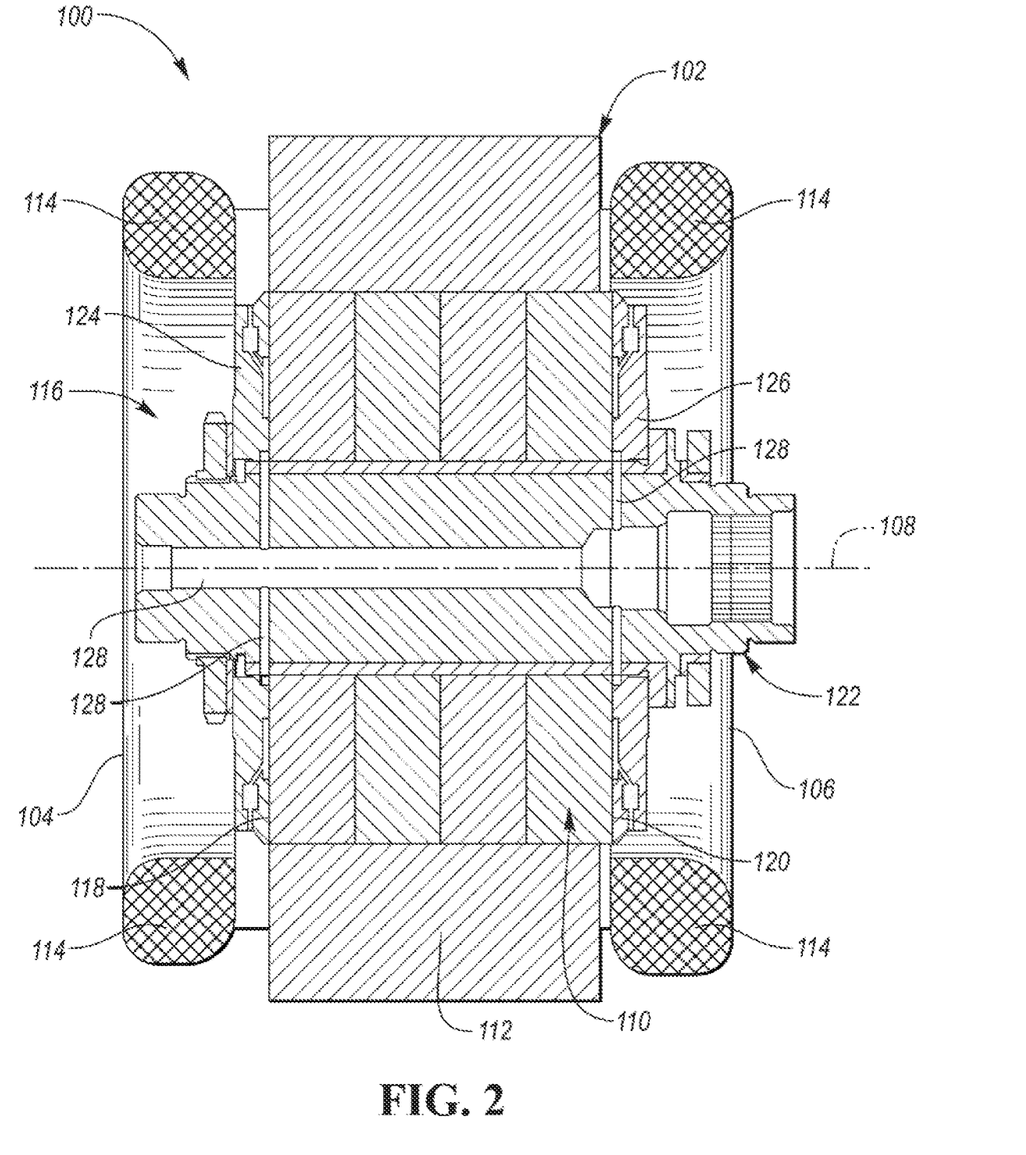
FIG. 2 is a cross-sectional view of an electric machine.

Referring to FIG. 2, a cross-sectional view of an electric machine 100 is illustrated. The electric machine 100 may have the same properties, functionality, etc. of the M/G 18 described above. For example, the electric machine 100 may be configured to propel a vehicle. The electric machine 100 includes a stator 102 that extends in an axial direction between opposing axial stator ends. The opposing stator ends may be referred to as the first stator end 104 and the second stator end 106. The axial direction may extend along an axis of rotation 108 of a rotor 110 of the electric machine 100. The stator 102 includes a core 112 and end windings 114 that protrude axially (i.e., along the axis of rotation 108 of the rotor 110) from each of the first stator end 104 and the second stator and 106. The stator 102 defines a central opening 116. The rotor 110 is disposed within the central opening 116 of the stator 102. The rotor 110 also extends in the axial direction (i.e., along the axis of rotation 108 of the rotor 110) between opposing axial rotor ends. The opposing rotor ends may be referred to as the first rotor end 118 and the second rotor end 120.

The electric machine 100 may also include a rotatable shaft 122. A first end plate 124 may be secured to the first rotor end 118 and a second end plate 126 may be secured to the second rotor end 120. The first end plate 124 and second end plate 126 may define internal cavities, chambers, voids, channels, etc. (described in further detail below) that are configured to direct a cooling fluid onto the end windings 114 of the stator 102. The rotor 110, first end plate 124, and second end plate 126 are each affixed to the rotatable shaft 122 such that the rotor 110, first end plate 124, second end plate 126, and the rotatable shaft 122 may rotate as a singular unit. Portions and/or ends of the rotatable shaft 122 may be secured to bearings (not shown) that are affixed to a grounded component (e.g., transmission case or housing). The rotatable shaft 122 may define fluid delivery channels 128 that establish fluid communication between a fluid source (e.g., transmission pump 25) and the internal cavities, chambers, voids, channels, etc. of the first end plate 124 and/or second end plate 126.

Figures 3, 4:
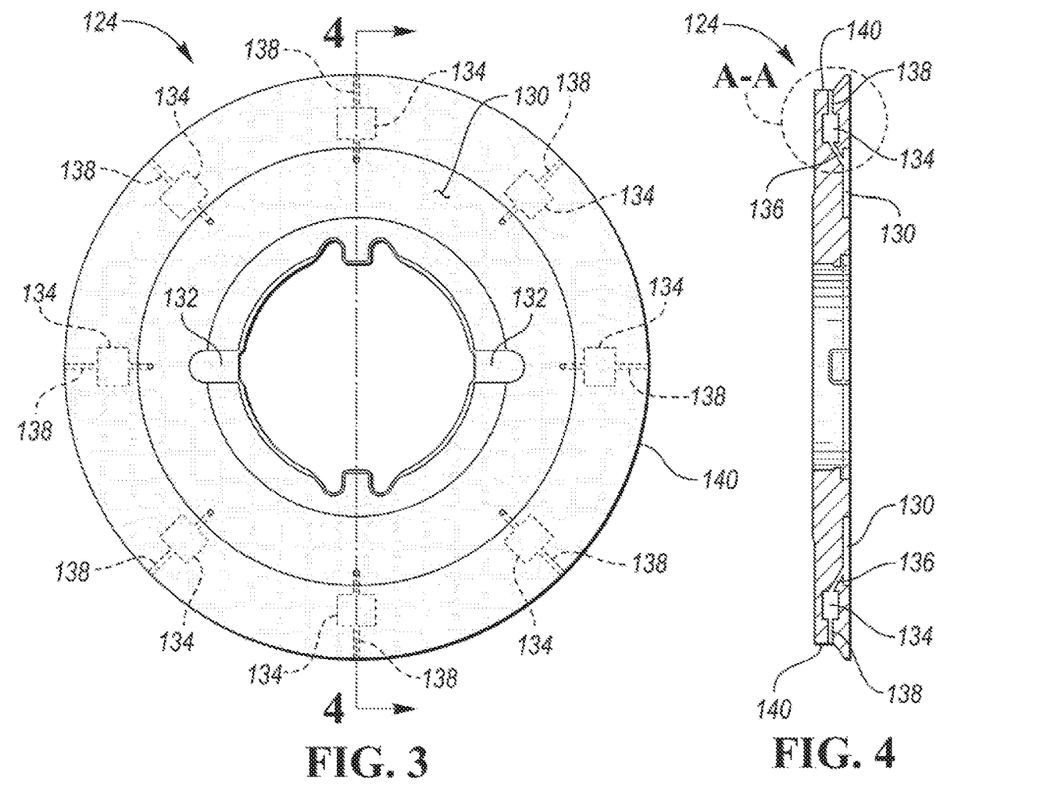
FIG. 3 is a front view of an end plate for an electric machine.
FIG. 4 is a cross-sectional view taken along line 4-4 in FIG. 3.
Figure 4A:
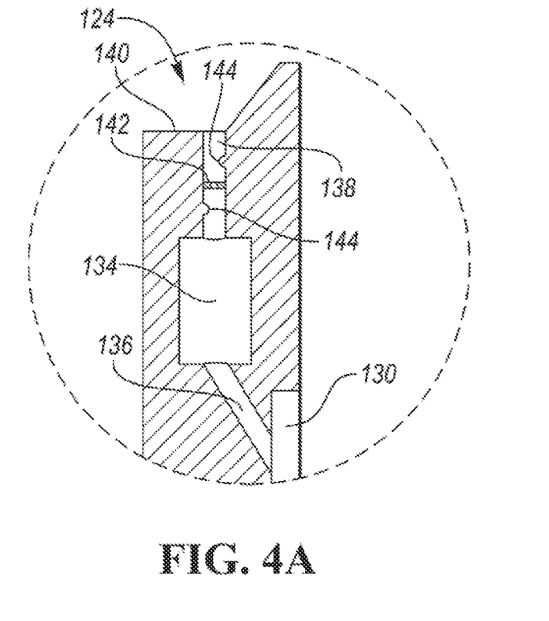
FIG. 4A is a magnified view of the area A-A in FIG. 4.

Referring to FIGS. 3, 4, and 4A, the first end plate 124 is illustrated in further detail. The first end plate 124 defines a plenum or primary chamber 130 that is in fluid communication with a fluid source (e.g., transmission pump 25). More specifically, the primary chamber 130 may be defined between the first end plate 124 and the rotor 110 when the first end plate 124 is secured to the rotor 110 (see FIG. 2). The first end plate 124 may define one or more slots 132 that establish fluid communication between the fluid delivery channels 128 defined within the rotatable shaft 122 the primary chamber 130. The fluid delivery channels 128 in turn establish fluid communication between the fluid source (e.g., transmission pump 25) and the primary chamber 130 via the one or more slots 132.

The first end plate 124 also defines a plurality of secondary chambers 134 that are each radially outward of the primary chamber 130. The primary chamber 130 is in fluid communication with each of the secondary chambers 134 via channels 136 that are also defined by the first end plate 124. Each of the channels 136 extends between and establishes fluid communication between the primary chamber 130 and one of the secondary chambers 134. The first end plate 124 also defines a plurality of outlet channels 138 that are configured to direct fluid outward from the first end plate 124 and onto the end windings 114 of the electric machine 100. Each the secondary chambers 134 is in fluid communication with at least one of the outlet channels 138. More specifically, each of the secondary chambers 134 establishes fluid communication between the fluid source (e.g., transmission pump 25) and at least one of the outlet channels 138 via the channels 136, the primary chamber 130, the one or more slots 132, and the fluid delivery channels 128 defined within the rotatable shaft 122. At least one of the outlet channels 138 may extend between one of the secondary chambers 134 and an outer peripheral surface 140 of the first end plate 124.

Flow restrictors 142 may be disposed between one or more of the secondary chambers 134 and the corresponding outlet channels 138 that are in fluid communication with the secondary chambers 134. More specifically, each flow restrictor 142 may be disposed within one of the outlet channels 138 between the corresponding secondary chamber 134 that the outlet channel 138 is in fluid communication with and an outer portion of the outlet channel 138 that directs fluid onto the end windings 114. The flow restrictors 142 may comprise an orifice plate (i.e., a plate having an orifice or aperture that extends through a thickness of the plate) that reduces the cross-sectional area at which fluid may flow through the outlet channels 138. The flow restrictors 142 are configured to increase the fluid pressure within the secondary chambers 142, which in turn increases the velocity of fluid being ejected out of the outlet channels 138 and onto the end windings 114. Increasing the velocity of fluid being ejected out of the outlet channels 138 and onto the end windings 114 increases the heat transfer between the end windings 114 and the fluid being directed onto the end windings, and therefore increases the cooling of the end windings 114.

The flow restrictors 142 act as nozzles that increase the velocity of fluid being ejected out of the outlet channels 138 and onto the end windings 114. Therefore, alternative features other than the flow restrictors 142 may be utilized to increase the velocity of the fluid being ejected out of the outlet channels 138 and onto the end windings 114. For example, the outlet channels 138 may have cross-sectional areas that taper as the outlet channels 138 extend away from secondary chambers 142, resulting in the outlet channels 138 forming nozzles.

The first end plate 124 may also include turbulent features that are configured to increase the turbulence of fluid being ejected out of the outlet channels 138 and onto the end windings 114. Increasing the turbulence of fluid being ejected out of the outlet channels 138 and onto the end windings 114 transforms the fluid in to coolant droplets which increases the coverage area of the fluid, which in turn increases the heat transfer between the end windings 114 and the fluid being directed onto the end windings, and therefore increases the cooling of the end windings 114. The turbulent features may comprise protrusions 144 that extend into the outlet channels 138 and disrupt fluid flow through the outlet channels 138 in order to introduce turbulence into the fluid flowing through the outlet channels 138.

It should be understood that any description regarding the first end plate 124 in FIGS. 3, 4, and 4A may also be applicable to the second end plate 126. For example, the second end plate 126 may define a tertiary chamber that has the same characteristics and functionality as the primary chamber, may define a plurality of quaternary chambers that has the same characteristics and functionality as the plurality of secondary chambers, may define channels that have the same characteristics and functionalities as channels 136, and may define a second plurality of outlet channels that has the same characteristics and functionality as outlet channels 138. Flow restrictors, nozzle features (e.g., flow restrictors 142 or a tapering of the second plurality of outlet channels), and/or turbulent features (e.g., protrusions 144) may also be incorporated into second end plate 126 as in the same manner as described above with respect to the first end plate 124.

Figure 5:
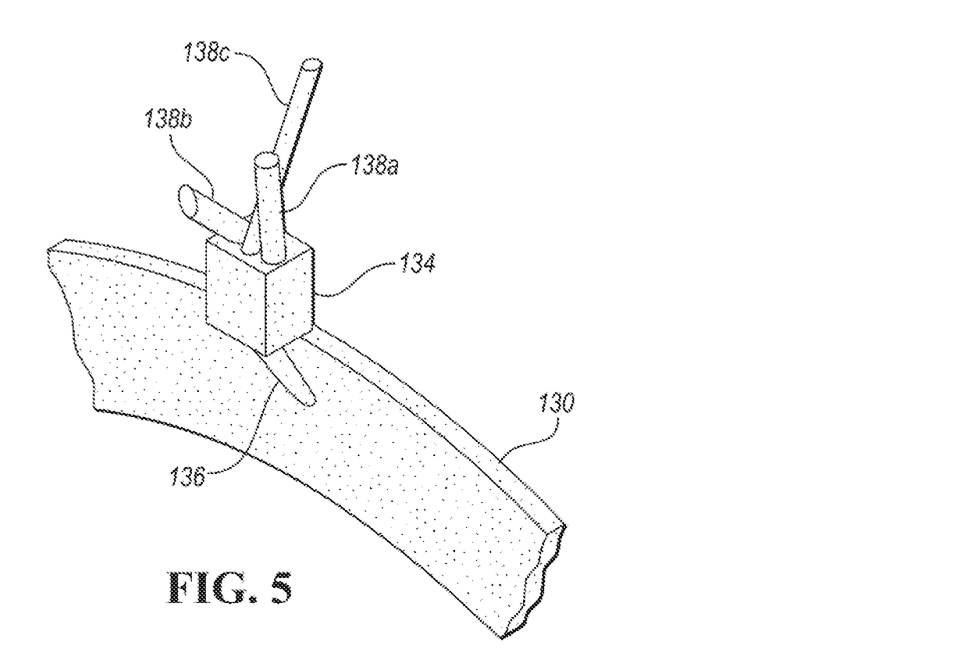
FIG. 5 represents a portion of the fluid flow domain within the end plate.

Referring to FIG. 5 a portion of the fluid flow domain within the first end plate 124 is illustrated. The fluid flow domain includes the primary chamber 130, one of the channels 136, one of the secondary chambers 134, a first outlet channel 138a, a second outlet channel 138b, and a third outlet channel 138c. The first outlet channel 138a, second outlet channel 138*b*, and third outlet channel 138*c* are each in fluid communication with the secondary chamber 134 and are configured to direct fluid outward from the first end plate 124 and onto the end windings 14. The second outlet channel 138*b* may be oriented at an angle relative to the first outlet channel 138*a* that ranges between 0° and 45°. The third outlet channel 138*c* may be oriented at an angle relative to the first outlet channel 138*a* that ranges between 0° and 45°. It should be understood that any description regarding the fluid flow domain within the first end plate 124 in FIG. 5 may also be applicable to the second end plate 126.

Figure 6:
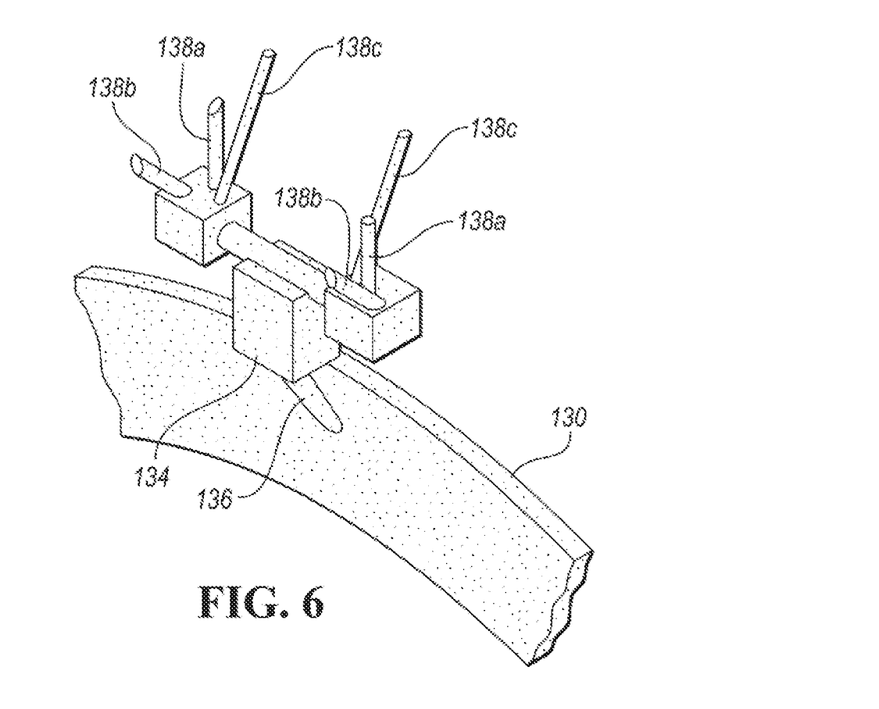
FIG. 6 represents an alternative embodiment of a portion of fluid flow domain within the end plate.

Referring to FIG. 6 an alternative embodiment of a portion of the fluid flow domain within the first end plate 124 is illustrated. The fluid flow domain includes the primary chamber 130, one of the channels 136, and one of the secondary chambers 134. In the alternative embodiment, however, the secondary chambers 134 are further connected to (i.e., in fluid communication with) additional sub-chambers 146. The sub-chambers 146 are then each in fluid communication with a first outlet channel 138*a*, a second outlet channel 138*b*, and a third outlet channel 138*c*, which are configured to direct fluid outward from the first end plate 124 and onto the end windings 114. The second outlet channels 138*b* may be oriented at an angle relative to the first outlet channels 138*a* that ranges between 0° and 45°. The third outlet channels 138*c* may be oriented at an angle relative to the first outlet channels 138*a* that ranges between 0° and 45°. It should be understood that any description regarding the fluid flow domain within the first end plate 124 in FIG. 6 may also be applicable to the second end plate 126.

It should be understood that the designations of first, second, third, fourth, etc. or primary, secondary, tertiary, quaternary, etc for chambers, channels, end plates, etc. or any other component, state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. An electric machine configured to propel a vehicle comprising:
    a stator extending in an axial direction between opposing stator ends, having end windings protruding from each stator end, and defining a central opening;
    a rotor disposed within the central opening and extending in the axial direction between opposing rotor ends; and
    an end plate secured to a first of the rotor ends, the end plate defining a primary chamber, a plurality of secondary chambers that are each radially outward of the primary chamber, and a plurality of outlet channels that are configured to direct luid onto the end windings, wherein the primary chamber is in fluid communication with a fluid source and each of the plurality of secondary chambers, and wherein each of the plurality of secondary chambers are in fluid communication with at least one of the outlet channels of the plurality of outlet channels.

2. The electric machine of claim 1 further comprising flow restrictors disposed between the secondary chambers and the outlet channels, wherein the flow restrictors are configured to increase a fluid pressure within the secondary chambers.

3. The electric machine of claim 1 further comprising a rotatable shaft that defines fluid delivery channels, wherein the rotor and end plate are secured to the shaft and the fluid delivery channels establish fluid communication between the fluid source and the primary chamber.

4. The electric machine of claim 1 further comprising protrusions that extend into the outlet channels that are configured to produce turbulence into a fluid flowing through the outlet channels.

5. The electric machine of claim 1 further comprising a second end plate secured to a second of the rotor ends, the second end second plate defining a tertiary chamber, a plurality of quaternary chambers that are each radially outward of the tertiary chamber, and a second plurality of outlet channels that are configured to direct fluid onto the stator ends, wherein the tertiary chamber is in fluid communication with the fluid source and the second plurality of quaternary chambers, and wherein each of the plurality of quaternary chambers are in fluid communication with at least one of the outlet channels of the second plurality of outlet channels.

6. The electric machine of claim 5 further comprising flow restrictors disposed between the plurality of quaternary chambers and the outlet channels of the second plurality of outlet channels, wherein the flow restrictors are configured to increase a fluid pressure within the plurality of quaternary chambers.

7. The electric machine of claim 5 further comprising a rotatable shaft that defines fluid delivery channels, wherein the rotor and second end plate are secured to the shaft and the fluid delivery channels establish fluid communication between the fluid source and the tertiary chamber.

8. The electric machine of claim 5 further comprising protrusions that extend into at least one of the outlet channels of the second plurality of outlet channels that are configured to produce turbulence into a fluid owing through the outlet channels.

9. An electric machine configured to propel a vehicle comprising:
    a stator having end windings protruding axially therefrom;
    a rotor disposed within the stator; and
    an end plate secured to an axial end of the rotor, the end plate defining a primary chamber, a secondary chamber that is radially outward of the primary chamber, and a first outlet channel that is configured to direct fluid onto the end windings, wherein the primary chamber is in fluid communication with a fluid source and the secondary chamber, and wherein the secondary chamber is in fluid communication with the first outlet channel.

10. The electric machine of claim 9 further comprising a flow restrictor disposed between the secondary chamber and the first outlet channel, wherein the flow restrictor is configured to increase a fluid pressure within the secondary chamber.

11. The electric machine of claim 9 further comprising a rotatable shaft that defines fluid delivery channels, wherein the rotor and end plate are secured to the shaft and the fluid delivery channels establish fluid communication between the fluid source and the primary chamber.

12. The electric machine of claim 9 further comprising protrusions that extend into the first outlet channel that are configured to produce turbulence into a fluid flowing through the first outlet channel to generate coolant droplets from the fluid, which increases the coverage area of the fluid.

13. The electric machine of claim 9, wherein the end plate defines a second outlet channel that is in fluid communication with the secondary chamber and is configured to direct fluid onto the end windings.

14. The electric machine of claim 13, wherein the second outlet channel is oriented at an angle relative to the first outlet channel that ranges between 0° and 45°.

15. The electric machine of claim 13, wherein the end plate defines a third outlet channel that is in fluid communication with the secondary chamber and is configured to direct fluid onto the end windings.

16. The electric machine of claim 15, wherein the third outlet channel is oriented at an angle relative to the first outlet channel that ranges between 0° and 45°.

17. The electric machine of claim 9, wherein the first outlet channel extends between the primary channel and outer peripheral surface of the end plate.

18. A vehicle comprising:
an electric machine configured to propel the vehicle, the electric machine comprising,
a stator having end windings,
a rotor, and
an end plate secured to an end of the rotor, the end plate defining a primary chamber, a secondary chamber that is radially outward of the primary chamber, and an outlet channel that is configured to direct fluid onto the end windings, wherein the primary chamber is in fluid communication with a transmission pump and the secondary chamber, and wherein the secondary chamber is in fluid communication with the outlet channel.

19. The vehicle of claim 18 further comprising a flow restrictor disposed between the secondary chamber and the outlet channel, wherein the flow restrictor is configured to increase a fluid pressure within the secondary chamber.

20. The vehicle of claim 18 further comprising protrusions that extend into the outlet channels that are configured to produce turbulence into a fluid towing through the outlet channels.

* * * * *